(12) United States Patent
Bobisuthi et al.

(10) Patent No.: US 6,735,453 B1
(45) Date of Patent: May 11, 2004

(54) AUTOMATIC HEADSET HOOKSWITCH

(75) Inventors: James F. Bobisuthi, Boulder Creek, CA (US); Lawrence W. Gollbach, Ben Lomard, CA (US); Robert J. Bernardi, Scotts Valley, CA (US); Steven F. Burson, Scotts Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 524 days.

(21) Appl. No.: 09/625,085

(22) Filed: Jul. 25, 2000

(51) Int. Cl.[7] .............................................. H04M 1/00
(52) U.S. Cl. ...................... 455/568; 455/74.1; 455/550; 455/569; 379/430; 379/447; 379/428.02; 379/442; 379/424
(58) Field of Search ................................ 455/74.1, 550, 455/568, 569, 344; 379/430, 424–25, 446–47, 454–55, 442, 428.02

(56) References Cited

U.S. PATENT DOCUMENTS

| | | | |
|---|---|---|---|
| 2,521,043 A | * | 9/1950 | Citso .......................... 379/455 |
| 4,392,017 A | * | 7/1983 | Torres ........................ 379/447 |
| 5,010,565 A | * | 4/1991 | Nash et al. .................. 455/74.1 |
| 5,524,047 A | * | 6/1996 | Brown et al. ............... 379/93.11 |
| 5,729,603 A | * | 3/1998 | Huddart et al. ........ 379/395.01 |
| 5,732,355 A | * | 3/1998 | Lipp et al. .................. 455/462 |
| 6,141,418 A | * | 10/2000 | Weiser et al. ................ 379/454 |
| 6,285,759 B1 | * | 9/2001 | Britto et al. ................. 379/447 |

FOREIGN PATENT DOCUMENTS

GB   WO 95/21499   *   8/1995   ............ H04M/1/02

* cited by examiner

Primary Examiner—William Trost
Assistant Examiner—Sharad Rampuria
(74) Attorney, Agent, or Firm—Peter Hsieh

(57) ABSTRACT

A headset storage device includes a headset cradle, a switch and a manual override device. The headset cradle has two positions: a first position when the headset cradle is supporting a headset and a second position when the headset cradle is not supporting a headset. The switch couples the audio signal to the alternate audio system when the headset cradle is in the first position and to the headset when the headset cradle is in the second position. The manual override device forces the headset cradle into one of the two positions regardless of whether the headset cradle is supporting a headset.

16 Claims, 10 Drawing Sheets

AUTOMATIC HEADSET HOOKSWITCH

BACKGROUND

A. Technical Field

The present invention relates generally to the field of communications, and more particularly, to an audio system that allows for automatic and manual switching between the use of a headset and the use of a desktop audio system.

B. Background of the Invention

Headsets are commonly used with audio systems to provide the user with a convenient and private way to hear the audio output. These audio systems are found in various applications such as computer multimedia systems, telecommunications devices, stereo systems, televisions and other similar systems with audio output. Conventionally, in order to switch between the use of a headset and the use of an alternate audio system, the user had to perform a number of manual steps.

Specific to telecommunications, a headset adapter is used to electrically interface the headset to the telephone system. Once the headset is connected to the telephone system through the adapter, the user has the choice of placing or responding to a telephone call with the traditional handset or with the headset. Use of the headset, however, typically requires the user to perform various manual steps making headset use difficult and less appealing. For instance, the user may be required to place the headset on the head and manually activate one or more switches on the adapter or telephone in order to route the telephone signals through the adapter so as to place or respond to a telephone call. These steps are significantly more time consuming and complicated than simply picking up a telephone handset. As a result, while headset use may be preferred by those users who are consistently using the telephone, such as switchboard operators and receptionists, many casual users still prefer using a handset over using a headset.

Headsets can also be used to interface with computer audio systems. However, like the use of headsets with telephones, the user must perform a number of manual steps in order to switch between using the headset and using the alternate audio system. Specifically, the use of a headset with a desktop computer requires the user to manually connect the headset cables to the computer system. The level of difficulty entailed in making this connection depends on the type of computer system to which the user is connecting the headset. For instance, in the most common configuration, the computer system will have speakers that do not have connections for either the headphone cable or the microphone cable of the headset. In order to use the headset, the user would have to disconnect the speakers from a sound card installed in the computer and connect the headset to the sound card. Since the connections for the sound card are typically in the back of the computer, this disconnecting and connecting is extremely inconvenient. This is especially so because the two connections in the sound card for the headset, one for the headphone and one for the microphone, are not easily distinguished from each other. The user would thus, have to take special care not to confuse the two connections.

In the second most common configuration, the computer system will have speakers that have a headphone connection but do not have a microphone connection. In this case, the user may have to split the dual cable of the headset in order to connect the headset receiver cable into the headphone connection that is located in the desktop speaker, and the headset microphone cable into the sound card that is located in the back of the computer. Changing between the headset and the desktop speakers will be significantly easier in this case since the headphone connection may be located in the front of the computer. However, changing from the headset microphone to a desktop microphone will create the same problems for the user as outlined above with the speaker without connections.

In another, less common configuration, the computer system will have speakers with both headphone and microphone connections. In this case, disconnection of the headset would be relatively easy since the connections in the speaker are readily accessible and the user would simply have to unplug the headset cables. Connection of the headset, however, would still require extra care so as to avoid confusing the two connections even if the connections are located in front of the computer. In any event, the user must still manually and repeatedly plug and unplug the headset cables in order to use the headset.

Furthermore, in all of the above scenarios, the configuration does not provide for convenient storage of the headset. The user is left to store the headset on the desktop, on a stand, or in a manner of his or her own devise. This lack of storage for the headset also inhibits the use of a headset by making it more inconvenient to switch between the use of a headset and the use of an alternate audio system.

Accordingly, it is desirable to provide a system that facilitates quick, convenient switching between the use of a headset and the use of an alternate audio system for various electronic audio devices. Furthermore, it is desirable to provide storage for the headset when it is not in use.

SUMMARY OF THE INVENTION

The present invention overcomes the foregoing shortcomings by providing a headset storage device for an audio system that allows for convenient automatic or manual switching between the use of a headset and the use of an audio system's speaker. Generally, when a headset is stored on the headset storage device, the audio system automatically switches to the use of an alternate audio system, such as a telephone handset or a set of speakers for a computer. When the user removes the, headset from storage, the headset is automatically activated and the user can interface with the system through the headset. In one embodiment, the user can override this automatic switching with a manual override device. The manual override device allows the user to force the system to activate either the headset or the desktop speakers regardless of whether the headset is stored on the headset storage device. Thus, for instance, the user could interface with the desktop audio system even though the headset is not in storage.

In one embodiment, a headset storage device includes a headset cradle, a switch, and a manual override device. The cradle is arranged to respond to the presence or absence of a headset by respectively activating or deactivating the switch. The switch controls an interface of the headset to the audio system. When deactivated, in the absence of the headset (i.e., the user has put the headset on) the switch couples the headset to the audio system. When activated by the presence of the headset (i.e., the user has stored the headset,) the switch uncouples the headset, thereby allowing use of the speakers of the system, the telephone handset, or the like. A manual override device toggles the switch between its active and inactive positions regardless of whether the headset is present or absent in the headset cradle.

In another embodiment, the headset storage device is incorporated into a desktop speaker such that the earpieces of the headphones rest on either side of the speaker. The switch is located on a side of the speaker, about where the earphone rest. In this case, the headset activates the switch with pressure of the headphones on the switch.

DETAILED DESCRIPTION OF THE PREFERRED EMBODIMENTS

Generally, the present invention relates to a headset storage device that detects the presence of a stored headset and upon this detection, automatically switches an audio connection from the headset to an alternate audio system. In the absence of a stored headset, the device automatically switches the audio connection back from the alternate audio system to the headset. The alternate audio system can be a desktop speaker set and microphone for a desktop computer, a telephone system, a stereo system or any other similar system with audio output. In addition to this automatic switching, the storage device also provides a manual override. The manual override allows the user to force the connection to either the headset or the alternate audio system regardless of whether a stored headset is detected.

Figure 1:
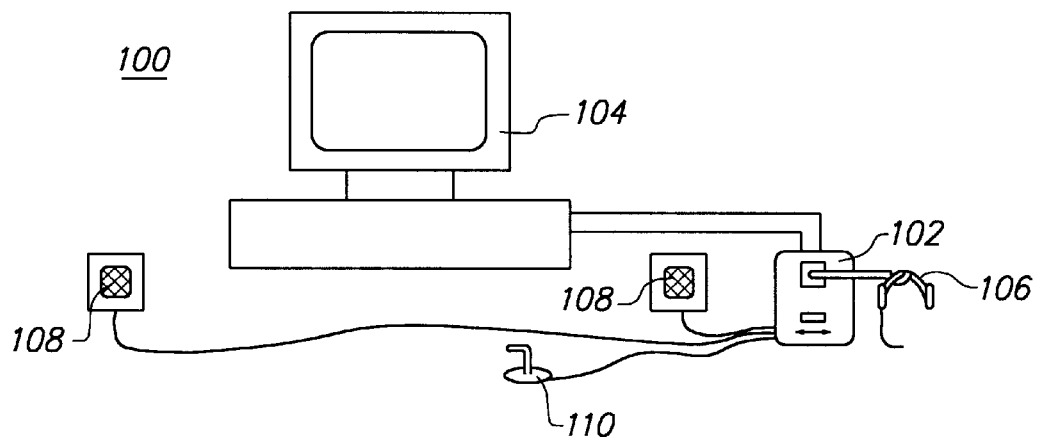
FIG. 1 depicts a computer system in accordance with the present invention including a headset storage device, a desktop computer, a headset, a set of desktop speakers, and a desktop microphone.

FIG. 1 depicts a computer system 100 including a headset storage device 102, a computer 104, a headset 106, a set of speakers 108, and a microphone 110. The headset storage device 102 is coupled to the headset 106, the speaker, 108, the microphone 110, and the computer 104. The headset storage device 102 switches the audio connection of the computer 104 between the headset 106 and the speaker set 108 and microphone 110, depending on whether the headset 106 is stored on the headset storage device 102.

Figure 2:
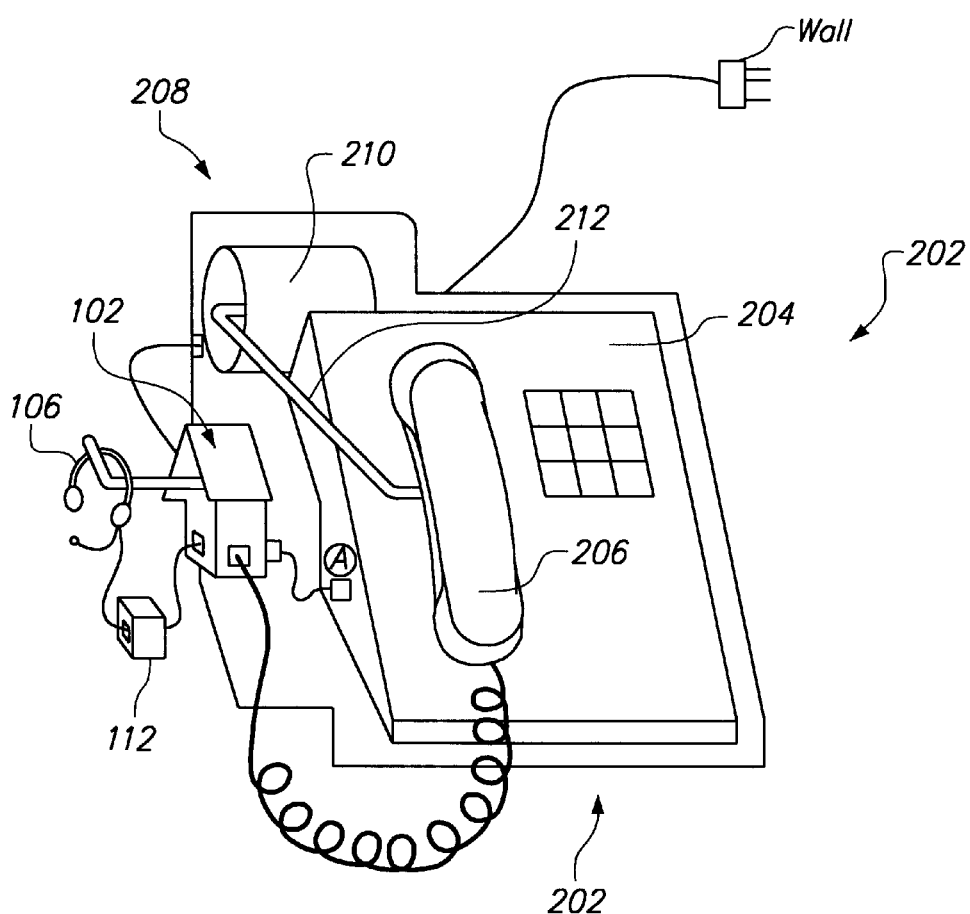
FIG. 2 depicts a telephone communication system in according with the present invention including a telephone, the headset storage device, and the headset.

FIG. 2 depicts a telephone communication system 200 including a telephone 202, the headset storage device 102, a handset lifter 208 and the headset 106 with its adapter 112. The telephone 202 includes a telephone body 204 and a telephone handset 206. The handset lifter 208 includes a motor 210 and a lift arm 212. The headset storage device 102 is electrically connected to the telephone body 204 and the headset adapter 112 to receive and transmit signals from the telephone line. The headset storage device 102 automatically switches the audio connection of the telephone body 204 between the telephone handset 206 and the headset adapter 112, depending on whether the headset 106 is stored on the headset storage device 102. When the headset 106 is lifted from the headset storage device 102, the motor 210 of the handset lifter 208 is activated causing the lift arm 212 to lift the handset 206. This lifting of the handset allows for the connection of the telephone body 204 to the telephone line. As a result, the audio signal will be transmitted and received by the headset 106 via the headset adapter 112.

Figure 3:
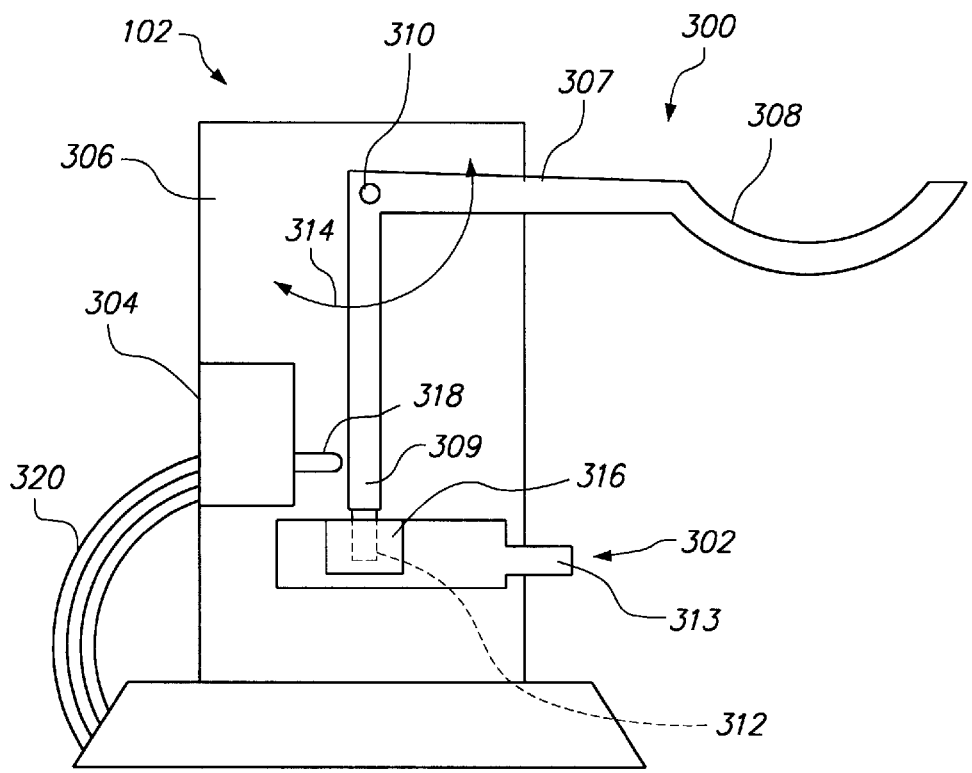
FIG. 3 illustrates one embodiment of the operative elements of the headset storage device, including a headset cradle, a switch, a manual override device and a housing component.

FIG. 3 illustrates the operative elements of one embodiment of the headset storage device 102. The headset storage device 102 includes a headset cradle 300, a manual override device 302, a multi-contact switch 304, and a housing 306. In this embodiment, the headset cradle 300 includes a cradle hook 308 for holding the stored headset 106, a horizontal arm 307, a vertical arm 309, a pivot axle 310, and a follower 312. The manual override device 302 includes a raised portion 313, and a well 316. The switch 304 includes an activation button 318 and system connections 320.

The headset cradle 300 is generally an L-shape. The cradle hook 308 is at the end of the upper, horizontal arm 307 of the headset cradle 300. The vertical arm 309 is coupled to the end of the horizontal arm 307 opposite from the cradle hook 308. Located where the horizontal arm 307 and vertical arm 309 meet, is the horizontal pivot axle 310, which allows for rotation of the headset cradle 300 as shown by arrows 314. The follower 312 is at the end of the vertical portion of the headset cradle 300 and sits in the well 316 of the manual override device 362 to control movement of the headset cradle 300. The manual override device 302 is generally a rectangular shape. The well 316 is a cavity located in the center of the manual override device 302. The raised portion 313 is located on the front face of the manual override device 302 and is of the size and shape that a user could manually grip the raised portion 313 to manipulate the manual override device 302. The activation button 318 is located on the front face of the switch 304 and has two positions, one activated and one deactivated.

The switch 304 is located behind the vertical arm 309 of the headset cradle 300 such that vertical movement of the headset cradle 300 will press or release the activation button 318 to activate or deactivate it, respectively. A spring 322 is disposed between the switch 304 and the activation button 318 for bringing the arm 309 away from the switch 304. The housing component 306 supports the headset cradle 300, manual override device 302 and switch 304. The cradle hook 308, the raised portion 313 of the manual override device 302, and the system connections 320 are external to the housing 306 for user accessibility.

Storage of the headset 106 on the cradle hook 308 results in downward movement of the n horizontal arm 307 of the headset cradle 300 in response to the weight of the headset 106. This movement causes the headset cradle 300 to pivot about the horizontal pivot axle 310 such that the vertical arm 309 of the headset cradle 300 presses the activation button 318 and activates the switch 304. When the headset 106 is removed from storage to be used, the horizontal arm 307 of the headset cradle 300 is allowed to return to its horizontal state. The vertical arm 309 of the headset cradle 300 thus, returns to its vertical state, contact with the activation button 318 of the switch 304 is lost and the switch 304 is deactivated. The end result is that when the headset 106 is stored on the cradle hook 308, the alternate audio system is automatically connected to the computer sound card, telephone handset or the like, and when the headset 106 is in use, the headset speakers and microphone are automatically connected.

In cases where the user wants to avoid these automatic connections, or if a headset 106 is too lightweight to cause the headset cradle 300 to move, the invention allows for manual switching between the alternate audio system and the headset 106. The user can accomplish manual switching through manipulation of the manual override device 302.

Figure 4A:
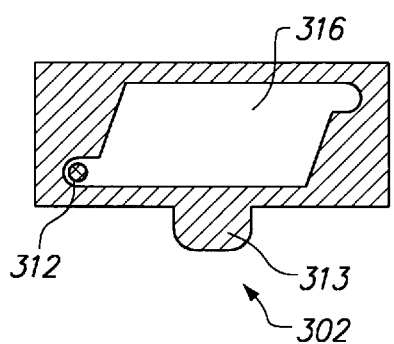
FIGS. 4a–c depict top cross-sections of one embodiment of the manual override device.
Figure 4B:
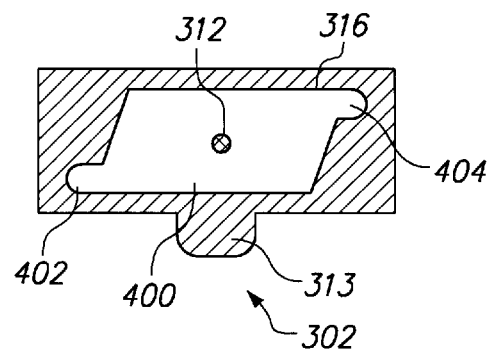
Figure 4C:
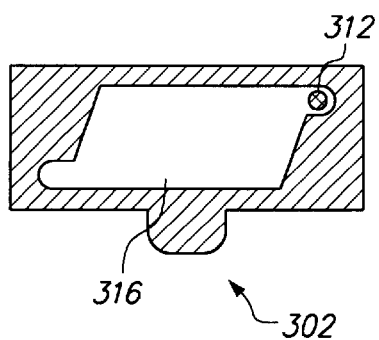

FIGS. 4a–c depict top cross-sections of one embodiment of the manual override device 302. In this embodiment, the manual override device 302 is generally a rectangular shape with a raised portion 313 on the front face of the device 302. The manual override device 302 includes a well 316 that is a cavity in the center of the device 302. The follower 312 is located within the well 316.

As can be seen from this view, the well 316 is made up of three portions: an auto portion 400, a headset portion 402, and a speaker portion 404. The auto portion 400 of the well 316 is between the headset portion 402 and the speaker portion 404 and is large enough to allow for forward and backward movement of the follower 312 within the well 316 in response to a stored headset 106. The headset portion 402 of the well 316 is of a size and position that prevents backward movement of the follower 312 such that the activation button 318 of the switch 304 cannot be pressed by the headset cradle 300. Similarly, the speaker portion 404 of the well 316 is of a size and position that prevents forward movement of the follower 312 such that the headset cradle 300 is forced to press the activation button 318 of the switch 304. By moving the manual override device 302 from side to side among these three positions, the user can affect whether the system 100, 200 maintains a connection to the alternate audio system or to the headset 106. Those of skill in the art will appreciate that the shape and size of the well and the portions within the well may be varied in response to different shapes and configurations of the cradle and switch.

FIG. 4a depicts the manual override device 302 in the headset position, in which the follower 312 is restricted to the headset portion 402 of the well 316. In this position, the follower 312 is not free to move forward and backward under the weight of the headset 106 but is held in a forward position such that the vertical arm 309 is prevented from pressing the activation button 318 of the switch 304. Thus, when the headset 106 is stored, the system 100, 200 will still maintain a connection to the headset 106.

FIG. 4b depicts the manual override device 302 in the auto position. Movement of the manual override device 302 into the auto position facilitates automatic switching. In this position, the follower 312 is located in the auto portion 400 of the well 316. Because the follower 312 here is free to move forward and backward, a stored headset 106 will trigger a connection with the alternate audio system and the removal of the headset 106 from storage will trigger a connection to the headset 106.

FIG. 4c depicts the manual override device 302 in the speaker position, in which the follower 312 is restricted to the speaker portion 404 of the well 316. In this position, the headset cradle 300 is forced to press the activation button 318 of the switch 304. Thus, when the headset 106 is removed from storage, the system 100, 200 will still maintain a connection to the alternate audio system.

Figure 5:
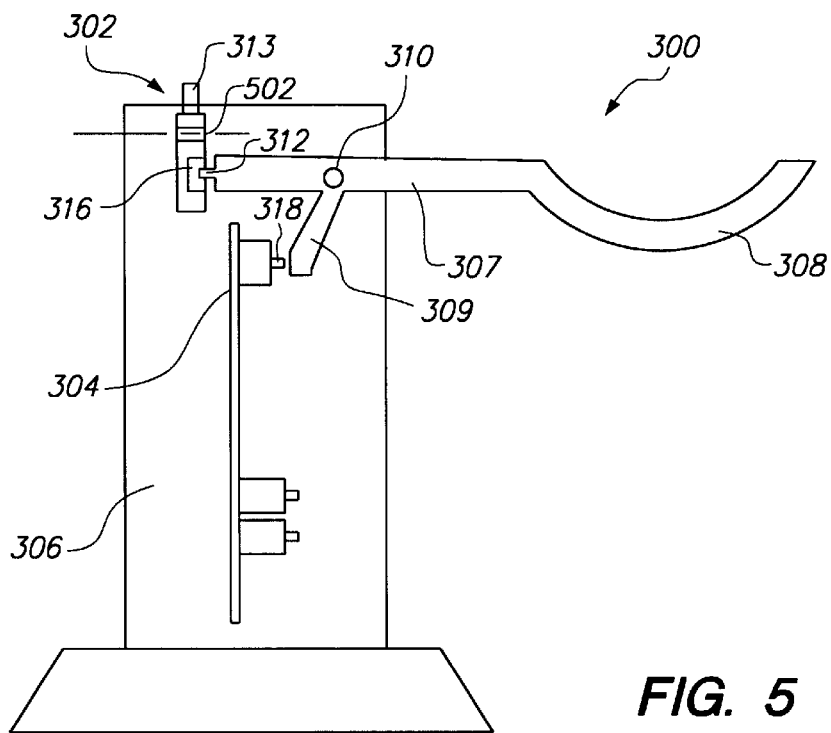
FIG. 5 illustrates an alternative embodiment of the operative elements of the headset storage device, including a headset cradle, a switch, a manual override device and a housing component.

FIG. 5 illustrates the operative elements of an alternative embodiment of the headset storage device 102. In this embodiment, the headset cradle 300 is generally a T-shape with the vertical arm 309 coupled to the horizontal arm 307 near the center of the horizontal arm 307. The follower 312 is at the end of the horizontal arm 307 of the headset cradle 300 opposite from the cradle hook 308. Like the previous embodiment, the manual override device 302 is located at the end of the follower 312 such that the follower is seated in the well 316 of the manual override device 302. Here, the manual override device 302 is positioned vertically and the, follower 312 moves vertically instead of forward and backward. This embodiment of the headset storage device 102 functions in the same manner as the previous embodiment, with the vertical arm 309 pressing and releasing the activation button 318 when a headset 106 is stored or removed from storage respectively.

Figure 6A:
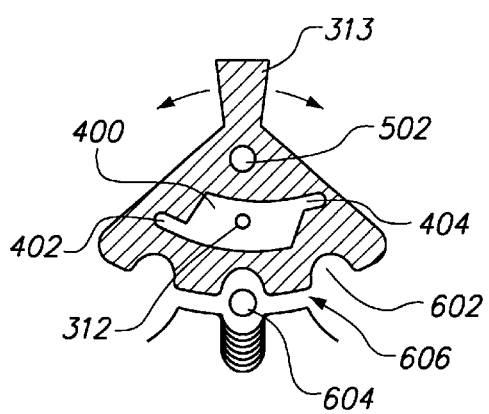
FIGS. 6a–c depict top cross-sections of an alternative embodiment of the manual override device.
Figure 6B:
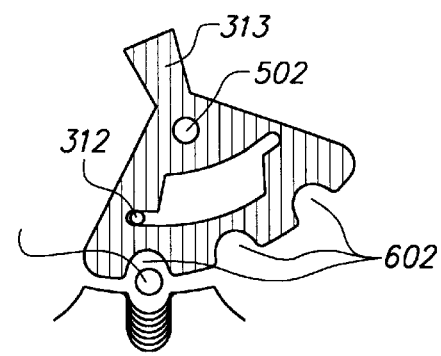
Figure 6C:
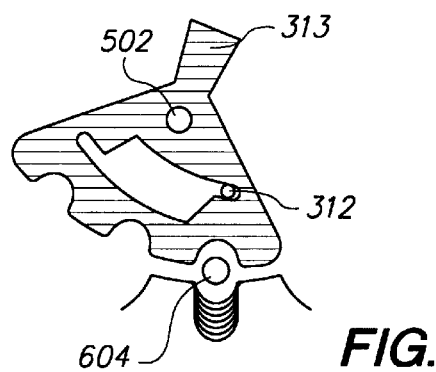

FIGS. 6a–c illustrate top cross-sections of an alternative embodiment of the manual override device 302. Here, the manual override device 302 is shaped generally like a quarter-circle. The manual override device 302 has a horizontal axle 502 located near the midpoint of the quarter-circle. Extending from the midpoint of the quarter-circle is a raised portion 313 for grasping the device and rotating it about the axle 502. The center of the manual override device 302 contains the well 316. The follower 312 is located within the well 316. Along the outside perimeter 606 of the quarter circle are three detents 602. These detents 602 house the ball of a stationary ball and spring mechanism 604 such that added pressure is required to rotate the device out of a detent 602.

The manual override device 302 is depicted in the auto position in FIG. 6a, in the headset position in FIG. 6b and in the speaker position in FIG. 6c. To move among these positions, thus restricting the follower 312 to the auto portion 400, headset portion 402, or speaker portion 404 of the well 316, the user rotates the raised portion 313 such that the manual override device 302 pivots about the axle 502. The ball of the stationary ball and spring mechanism 604 rests in the detents 602 when the manual override device 302 is in one of the three positions. The shape of the well 316 is similar to that of the previous embodiment and thus, pivoting the manual override device 302 restricts the movement of the headset cradle 300 in the same manner as in the previous embodiment. Note that the well shape is slightly curved since the travel of the manual override device 302 follows an arc rather than a line.

Figure 7:
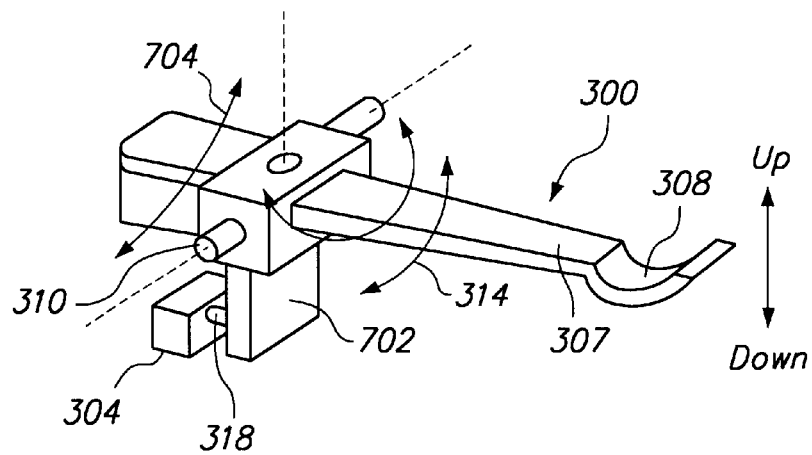
FIG. 7 illustrates another alternative embodiment of operative elements of the headset storage device including a headset cradle and a switch.

FIG. 7 illustrates another alternative embodiment of operative elements of the headset storage device 102. In this embodiment, the manual override device 302 is integrated into the housing 306. The manual override device 302 is described below in the discussion of FIG. 8. The horizontal pivot axle 310 is elongated and passes through a bore in the horizontal arm 307 to allow for side-to-side motion of the headset cradle 300 as it slides along the horizontal pivot axle 310. The vertical portion of the headset cradle 300 in this case is a flexible paddle 702. The flexible paddle 702 is located adjacent to the switch 304 and is rigid enough to press the activation button 318 of the switch 304, yet flexible enough to allow for exaggerated movement 314 of the headset cradle hook 308. The flexible paddle 702 is wide enough so that it presses the activation button 318 regardless of the horizontal location of the headset cradle 300 along the pivot axle 310. The headset cradle 300, in this embodiment, does not include a follower. Automatic connection to either the headset 106 or the alternate audio system occurs in the same way as that of the previous two embodiments of the headset detection device 102. When the headset 106 is stored on the headset cradle 300, the system 100, 200 is automatically connected to the alternate audio system. When the headset 106 is removed from the headset cradle 300, the system 100, 200 is automatically connected to the headset 106.

Figure 8B:
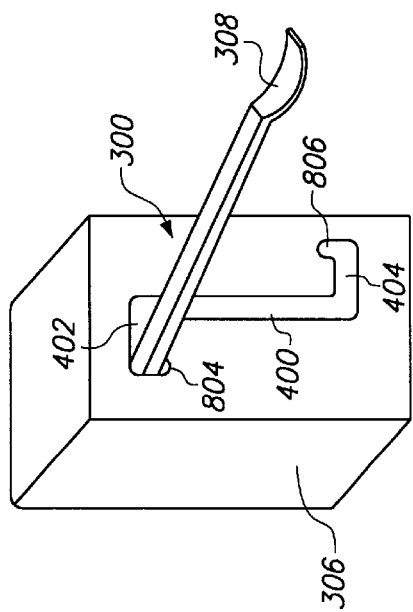
FIGS. 8a–c illustrate another alternative embodiment of the manual override device in which the manual override device is incorporated into the housing component.
Figure 8C:
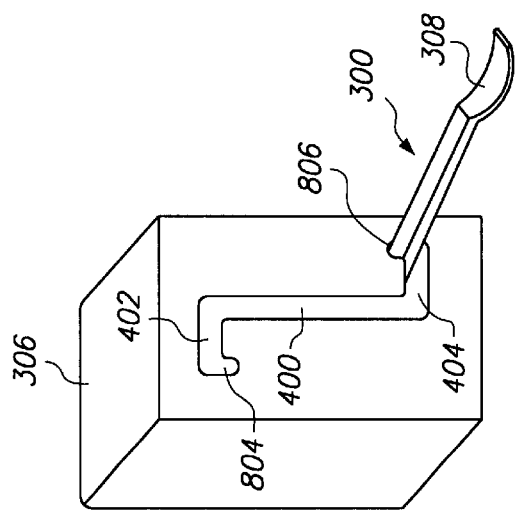
Figure 8A:
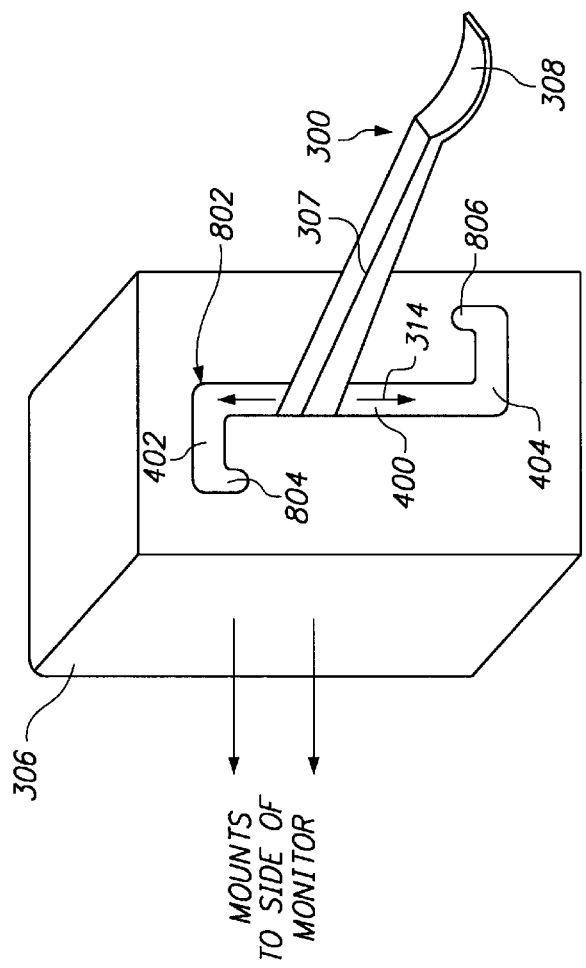

FIGS. 8a–c illustrate the manual override device 302 for this embodiment. The manual override device 302 is a Z-shaped opening 802 in the front of the housing 306 of the headset storage device 102. This opening is wide enough for the horizontal portion of the headset cradle 300 to fit within the opening 802. Like the well 316 of the manual override device 302 illustrated in FIGS. 4 and 6, the Z-shaped opening 802 has three portions: an auto portion 400, a headset portion 402 and a speaker portion 404. The auto portion 400 is the vertical part of the Z-shaped opening. The headset portion 402 is the top, horizontal part of the Z-shaped opening 802 and the speaker portion 404 is the bottom, horizontal part. Note that the orientation of the opening may be reversed such that the opening is a backwards Z-shape. At the end of each horizontal part is a notch 804, 806 that is large enough to hold the horizontal portion of the headset cradle 300.

FIG. 8a illustrates this embodiment of the headset storage device 102 in the auto position. In this position, the headset cradle 300 is in the vertical or auto portion 400 of the opening 802, and is free to move up and down thus facilitating automatic switching through the pressing and releasing of the activation button 318. To move up or down to the horizontal portions 402, 404 of the Z-shaped opening 802, the headset cradle 300 pivots along the horizontal pivot axle 310. The flexible paddle 702 allows for exaggerated movement of the headset cradle 300 such that the headset cradle 300 can pivot enough to reach the position of one of the horizontal portions 402, 404 of the Z-shaped opening 802. To slide into one of the horizontal portions 402, 404 of the Z-shaped opening 802, the headset cradle 300 slides sideways 704 along the elongated horizontal pivot axle 310. If the headset cradle 300 is moved to the end of one of the horizontal portions 402, 404 of the Z-shaped opening 802, then it can rest in one of the notches 804, 806. In this case, the headset cradle 300 will have to be manually moved from the notch 804, 806 in order to return it to the automatic portion 400 of the manual override device 302. This prevents the cradle 300 from moving from one position to another without the specific intent of the user.

If the headset cradle 300 is placed into one of the horizontal portions 402, 404 of the Z-shaped opening 802, then its vertical movement will be restricted. As depicted in FIG. 8b, when the headset cradle 300 is in the headset portion 402 of the manual override device 302, the flexible paddle 702 is prevented from pressing the activation button 318 of the switch 304. Thus, the system 100, 200 maintains a connection to the headset 106. As depicted in FIG. 8c, when the headset cradle 300 is in the speaker portion 404 of the manual override device 302, the flexible paddle 702 is forced to press the activation button 318 of the switch 304. In this case, the system 100, 200 maintains a connection to the alternate audio system regardless of whether the headset 106 is being stored.

Figure 9:
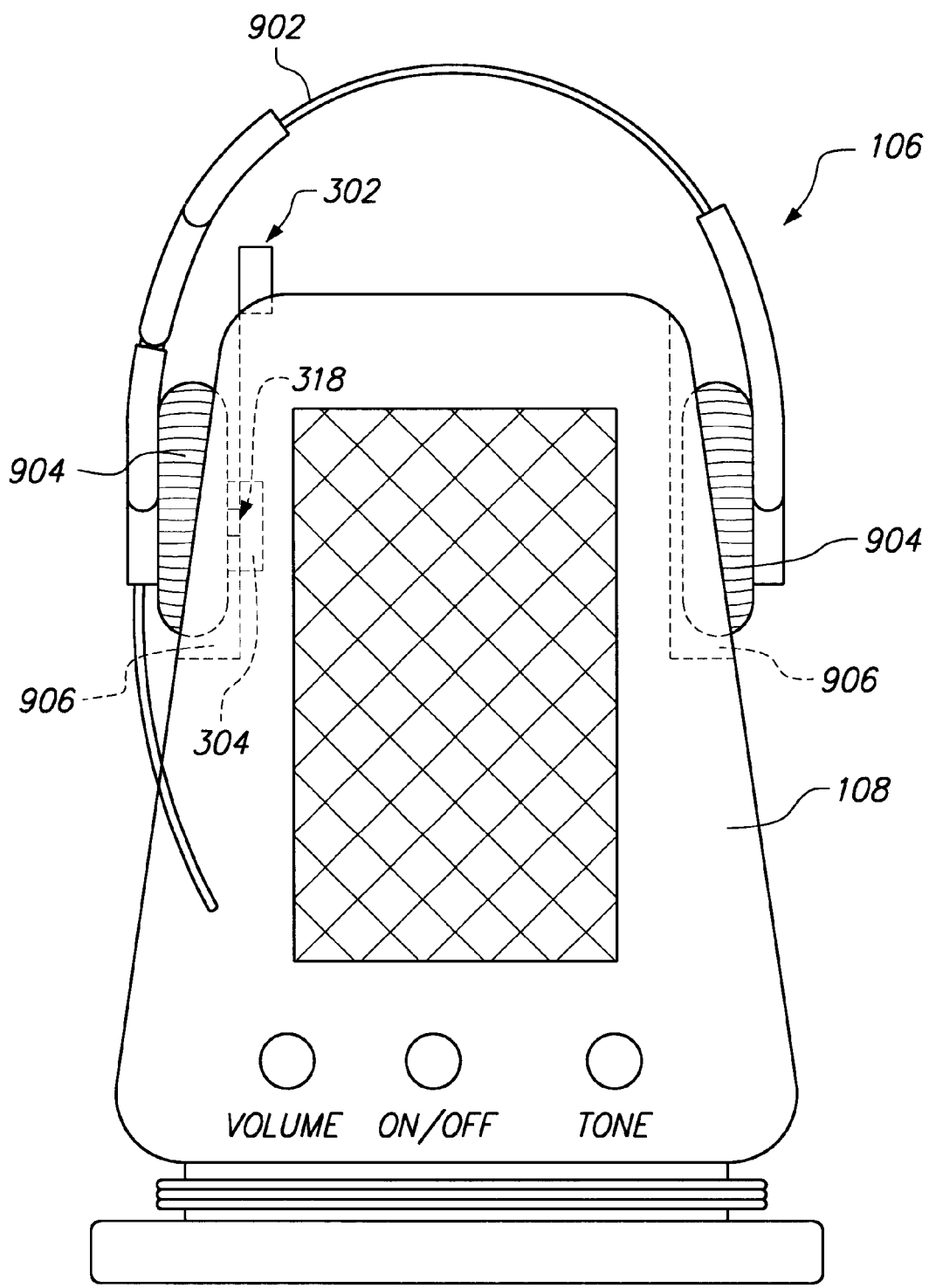
FIG. 9 illustrates yet another embodiment of the operative elements of the headset storage device in which the storage device is integrated into a desktop speaker.

FIG. 9 illustrates yet another embodiment of the operative elements of the headset storage device 102. In this embodiment, the headset storage device 102 is integrated into a desktop speaker 108, or similarly box-shaped container, such that earpieces 904 of the headphones 106 rest on either side of the speaker 108. Each side of the speaker has a cavity 906 that cradles one earpiece 904 of the headset 106. In this embodiment the switch 304 is located on the inside of one of the cavities 906 such that pressure from the earpiece 904 on that side presses the activation button 318 of the switch 304. Note that if a monaural headset is used, its single earpiece 904 is placed in the side cavity 906 with the switch 304. The headset 106 should have a headband 902 that is curved with enough tension that the earpieces 904 create enough pressure to press the activation button 318. Thus, when the headset 106 is stored on the speaker 108, ;the earpiece 904 presses the activation button 318 and the system 100, 200 is connected to the alternate audio system. When the headset 106 is removed from storage, the activation button 318 is released and the system 100, 200 is connected to the headset 106.

Figure 10:
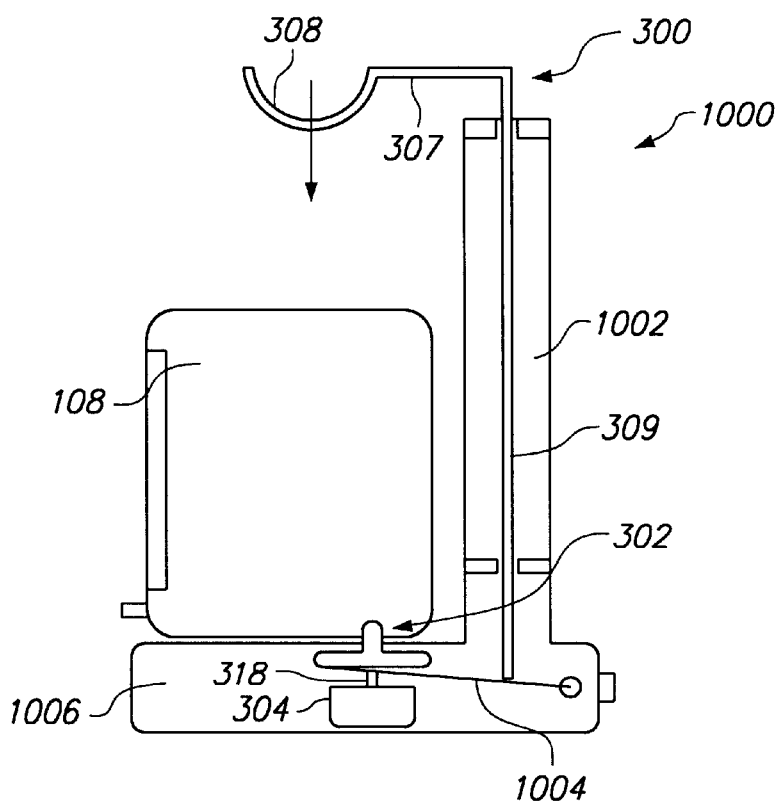
FIG. 10 illustrates another embodiment of the components of the headset storage device, in which the headset storage device is integrated into a stand for a desktop speaker.

FIG. 10 illustrates another embodiment of the components of the headset storage device 102, in which the headset storage device 102 is integrated into a stand 1000 for a desktop speaker 108. In this embodiment, the headset cradle 300 has neither a pivot axle 310 nor a follower 312. The vertical arm 309 of the headset cradle is encased in a shaft 1002. The bottom of the vertical arm 309 of the headset cradle 300 rests on a horizontal lever 1004. This lever 1004 is encased in a horizontal platform 1006 such that a speaker 108 may rest on top of the platform 1006. The lever 1004 is adjacent to the activation button 318 of the switch 304 such that downward movement of the headset cradle 300 causes the lever 1004 to press the activation button 318. As a result, when the headset 106 is stored in the cradle hook 308, the weight of the headset 106 causes the headset cradle 300 to move downward and press the lever 1004 which in turn, presses the activation button 318 and connects the system 100, 200 to the alternate audio system. Likewise, when the headset 106 is removed from storage, the activation button 318 is released and the system 100, 200 is connected to the headset 106.

Figure 11A:
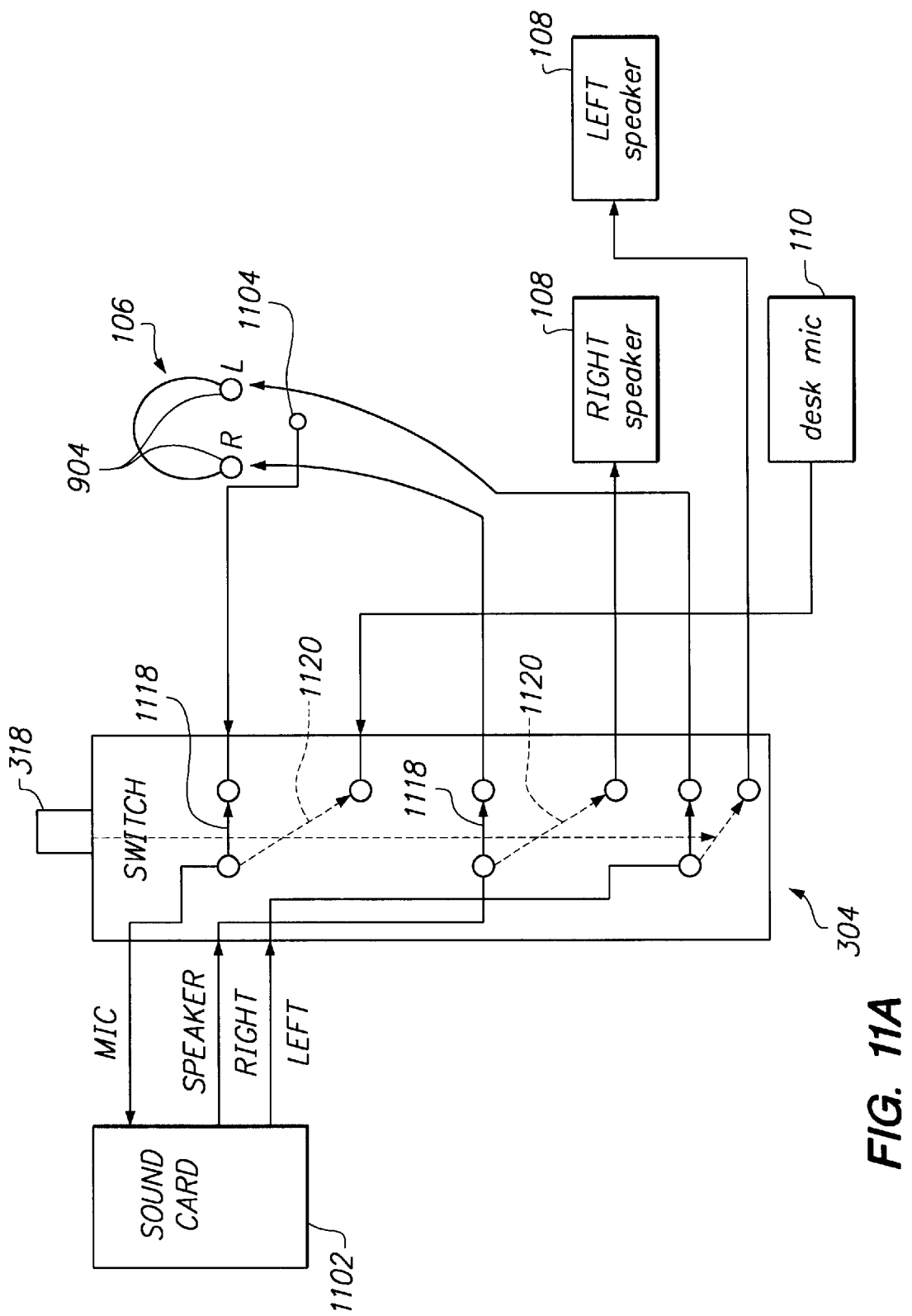
FIGS. 11a–c are block diagrams of the connection for the computer system 100.
Figure 11B:
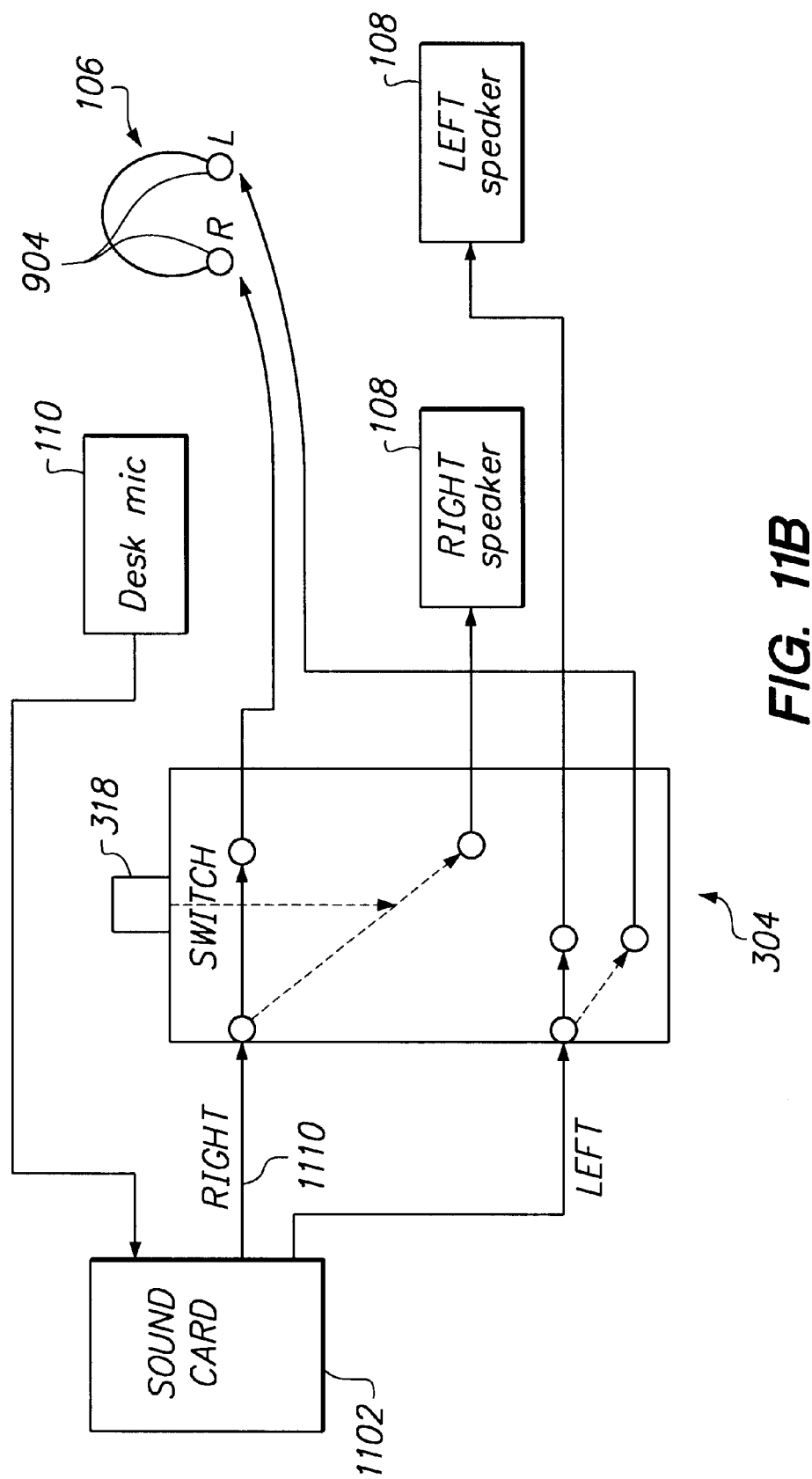
Figure 11C:
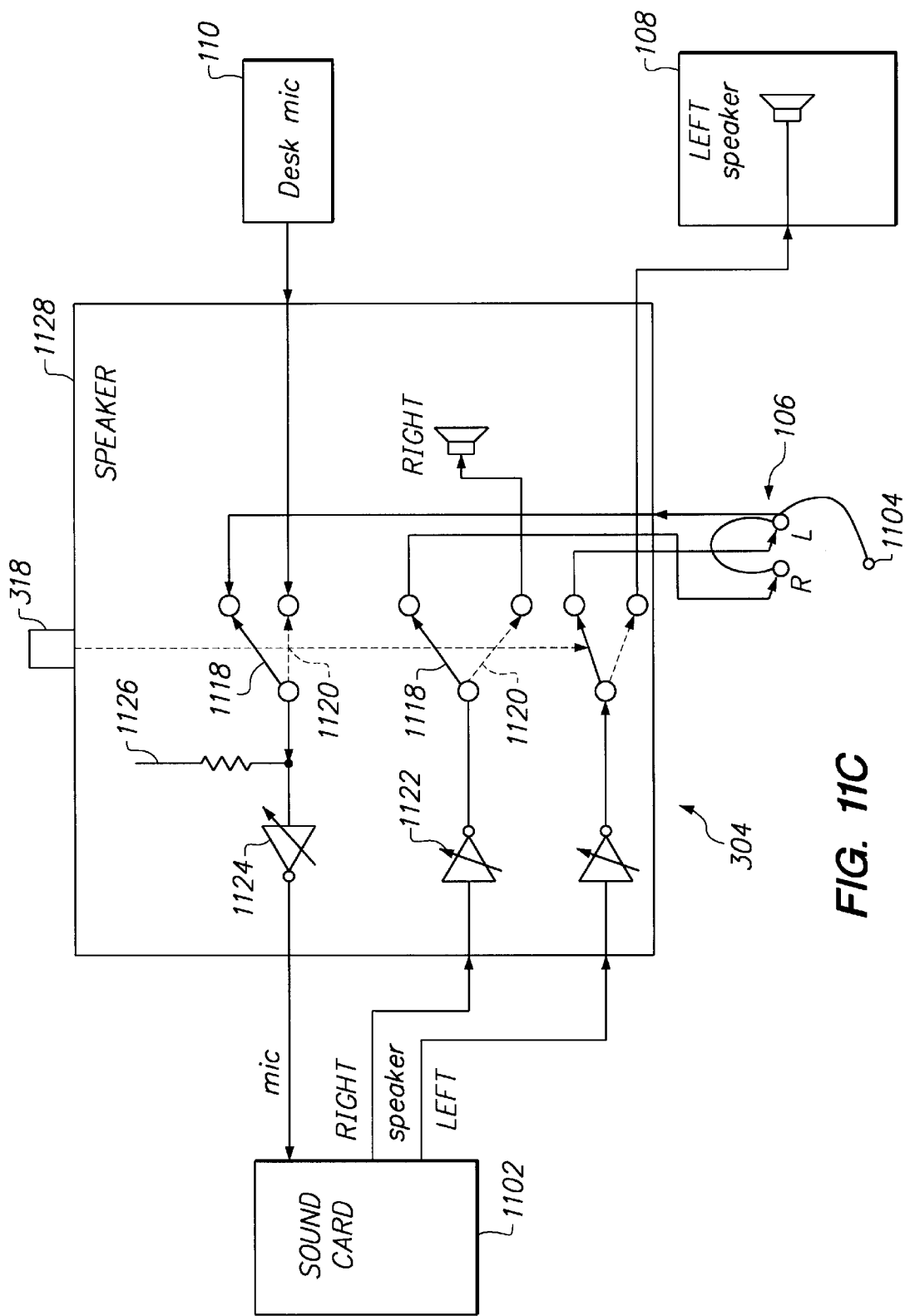

FIGS. 11a–c are block diagrams of the connections for the computer system 100 including a sound card 1102, a switch 304, a headset 106, desktop speakers 108 and a desktop microphone 110, if the system includes one. The switch 304 includes an activation button 318. In one embodiment, as illustrated in FIG. 11a, the headset 106 includes earpieces or headphones 904 and a microphone 1104. The switch 304 is coupled to the sound card 1102, the headphones 904, the headset microphone 1104, the desktop speakers 108 and the desktop microphone 110.

The switch 304 has two states 1118, 1120: one when the activation button 318 is released, as shown in FIG. 11a, and one when the activation button 318 is pressed. In the first state 1118, the activation button 318 is released and the audio signal is sent and received by the headset 106. The audio signal is transmitted through the headset microphone 1104 to the switch 304 and then to the sound card 1102. An audio signal that is generated at the sound card 1102 is transmitted to the switch 304 and then to the headphones 904.

In the second state 1120 of the switch 304, the activation button 318 is pressed and the audio signal is sent by the external microphone 110 and received by the external speakers 108. The audio signal is transmitted through the microphone 110 to the switch 304 and then to the sound card 1102. The audio signal generated at the sound card 1102 is transmitted to the switch 304 and then to the speakers 108.

FIG. 11b illustrates an alternative embodiment of the connections for the computer system 100 in which the headset 106 does not have a microphone connection. In this embodiment, the audio signal is transmitted through the microphone 110 directly to the sound card without going through the switch 304, thus this transmission is not affected by the state of the switch 304. Similar to the previous embodiment, the audio signal generated at the sound card 1102 is transmitted to the switch 304 and then to either the speakers 108 or the headphones 904 depending on the state of the switch 304.

FIG. 11c illustrates another alternative embodiment of the connections for the computer system 100 in which the switch 304 is integrated into a powered desktop speaker 1128. In this embodiment, the powered speaker 1128 is coupled to the sound card 1102, the headphones 904, the headset microphone 1104, the external microphone 110, and a second desktop speaker 108. The powered speaker 1128 includes a microphone preamplifier 1124, a microphone bias 1126, and an audio amplifier 1122. The audio signals are transmitted in the same manner here as the audio signals generated by the system in FIG. 11a.

Figure 11D:
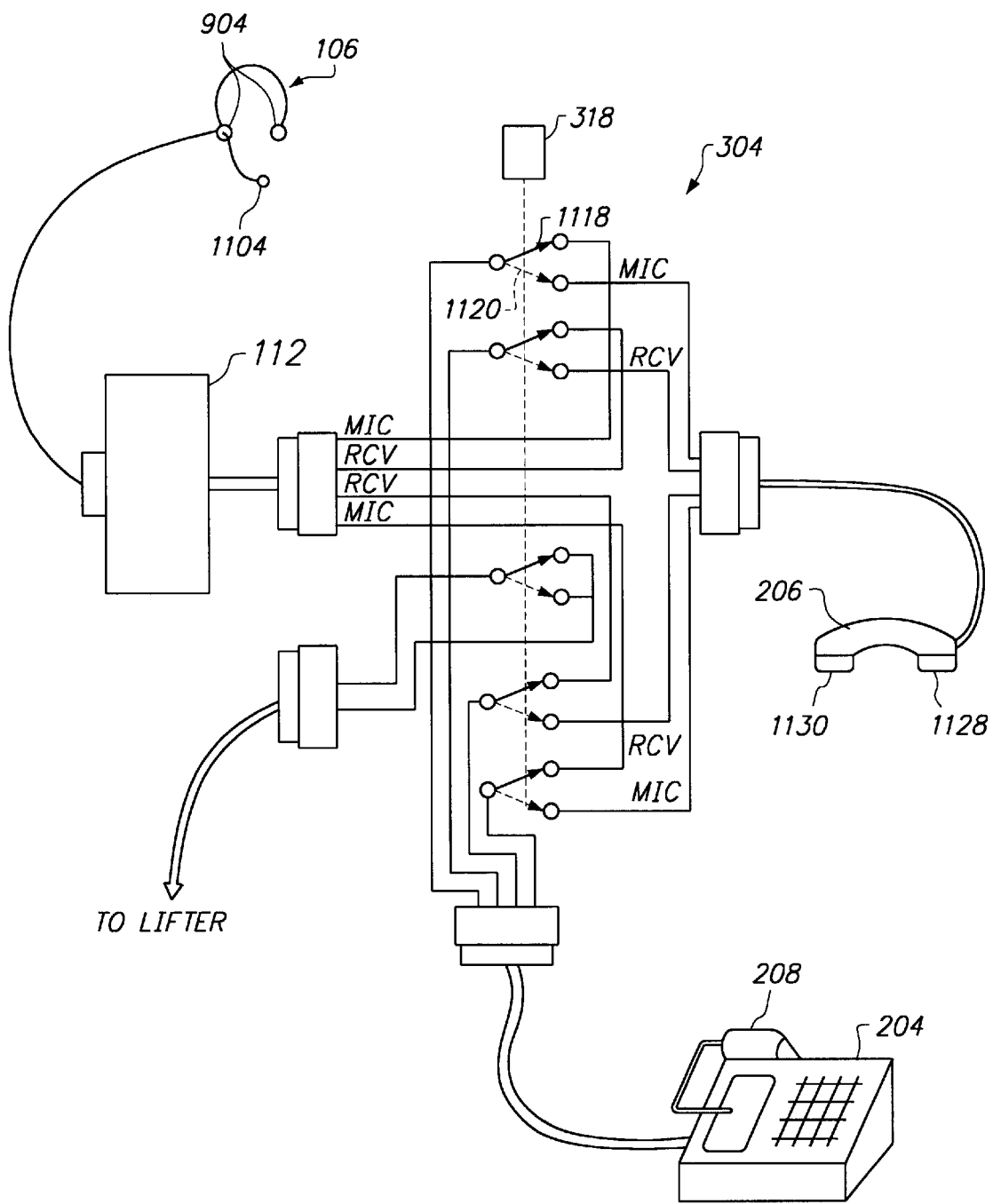
FIG. 11d is a connection diagram for the telephone system 200.

FIG. 11d illustrates the connections for the telephone system 200 including a telephone base 204, a handset 206, a switch 304, a headset 106, a headset adapter 112 and a handset lifter device 208. The switch 304 includes an activation button 318. The headset 106 includes earpieces or headphones 904 and a microphone 1104. The switch 304 is coupled to the telephone body 204, the headset adapter 112, the handset 206, and the headset lifter 208. The microphone 1104, and the speakers 904 are connected to the headset adapter.

The switch 304 has two states 1118, 1120: one when the activation button 318 is released, as shown in FIG. 11d, and one when the activation button 318 is pressed. In the first state 1118, the activation button 318 is released and the audio signal is transmitted from the microphone 1104 to the switch 304 and then to the telephone body 204. The audio signal generated at the telephone base 204 is transmitted to the switch 304 and then to the headset speakers 904.

In the second state 1120 of the switch 304, the activation button 318 is pressed and the audio signal is sent and received by the handset 206. The audio signal is transmitted through the handset microphone 1128 to the switch 304 and then to the telephone body 204. An audio signal that is generated at the telephone body 204 is transmitted to the switch 304 and then to the handset receiver 1130. An optional set of contacts is shown that connects a logic signal or power source to a mechanical handset lifter in the first state of switch 304. These contacts provide automatic off hook control of the telephone when the headset is lifted from its holder.

Although the invention has been described in considerable detail with reference to certain preferred embodiments thereof, other embodiments are possible. Therefore, the scope of the appended claims should not be limited to the description of the preferred embodiments contained herein. For instance, it should be understood that the combination of which headset cradle is used with which manual override device varies widely. The manual override device 302 of FIG. 4, for example, could be used in conjunction with the headset cradle 300 of FIG. 3 or FIG. 5. The same is true of the manual override device 302 of FIG. 6. Furthermore, the headset storage device could implement headset detection in any number of ways including through the use of magnetic reed switches or optical sensing.

We claim:

1. An apparatus for selectively routing an audio signal between a headset and an alternate audio system, the apparatus comprising:

a support surface for receiving and supporting the headset; and a switch having a first input for coupling with the alternate audio system and a second input for coupling with the headset, the switch alternately coupling the alternate audio system to the audio signal in response to the headset being received by the support surface and coupling the headset to the audio signal in response to the headset being removed from the support surface.

2. The apparatus of claim 1, further comprising a manual override device, the manual override device comprising:

an auto position for allowing the switch to alternately couple the alternate audio system to the audio signal in response to the headset being received by the support surface and couple the headset to the audio signal in response to the headset being removed from the support surface;

an alternate audio system position for coupling the alternate audio system to the audio signal; and a headset position for coupling the headset to the audio signal.

3. The apparatus of claim 1, wherein the switch further comprises an activation button having an activated position coupling the audio signal to the alternate audio system; and a deactivated position coupling the audio signal to the headset.

4. The apparatus of claim 1, wherein the support surface is part of a headset cradle, the headset cradle having a first arm extending horizontally from the support surface, and a second arm extending vertically from a connection point with the first arm, the second arm having a first position in response to a headset resting on the support surface and a second position in response to the headset being removed from the support surface.

5. The apparatus of claim 4, wherein the headset cradle further comprises a first pivot axle for allowing rotation of the cradle about the first pivot axle, the first pivot axle passing through the connection point.

6. The apparatus of claim 5, wherein the headset cradle further comprises a follower for restricting the movement of the second arm.

7. The apparatus of claim 6, further comprising a manual override device for restricting the movement of the second arm, the manual override device comprising:

an auto position for allowing the second arm to move between the first and second positions;

an alternate audio system position for restricting the second arm to the first position; and a headset position for restricting the second arm to the second position.

8. The apparatus of claim 7, wherein the manual override device further comprises a well for receiving the follower, the well comprising:

an auto portion having a shape and position within the well that allows the second arm to move between the first and second positions;

an alternate audio system portion having a shape and position within the well that restricts the second arm to the first position; and a headset portion having a shape and position within the, well that restricts the second arm to the second position.

9. The apparatus of claim 7, wherein the manual override device further comprises a raised portion for moving the manual override device among the auto position, the speaker position and the headset position.

10. The apparatus of claim 7, wherein the manual override device further comprises a second pivot axle for allowing rotation of the manual override device about the second pivot axle.

11. The apparatus of claim 5, wherein:
the first pivot axle is elongated to allow for side-to-side movement of the headset cradle along the first pivot axle; and
the second arm of the headset cradle is a flexible paddle for increasing the allowable rotation of the headset cradle about the first pivot axle.

12. The apparatus of claim 11, further comprising a housing having an opening through which the first arm extends, the opening comprising:
an auto portion having a shape and position within the opening that allows the second arm to move between the first and second positions;
an alternate audio system portion having a shape and position within the opening that restricts the second arm to the first position; and
a headset portion having a shape and position within the opening that restricts the second arm to the second position.

13. The apparatus of claim 4, further comprising a stand, the stand comprising
a base located under the headset cradle; and
a shaft encasing the second arm of the headset cradle; the shaft protecting the second arm such that the second arm can move between the first position and the second position.

14. The apparatus of claim 1, wherein the alternate audio system is a telephone handset, the apparatus further comprising:
a motorized handset lifter for lifting the handset in response to the second input of the switch and lowering the handset in response to the first input of the switch.

15. A method for selectively routing an audio signal between a headset and an alternate audio system, comprising:
coupling the alternate audio system to the audio signal in response to detecting the headset resting on a support surface; and
coupling the headset to the audio signal in response to detecting the headset being removed from the support surface.

16. The method of claim 15 further comprising:
coupling the alternate audio system to the audio signal in response to a first state of a manual override; and
coupling the headset to the audio signal in response to a second state of the manual override.

* * * * *